(No Model.)

L. P. LINDGREN.
GLASS TUBE CUTTER.

No. 365,190. Patented June 21, 1887.

WITNESSES:
George Binkenburg
C. Sedgwick

INVENTOR:
L. P. Lindgren
BY Munn & Co.
ATTORNEYS.

UNITED STATES PATENT OFFICE.

LAURENCE P. LINDGREN, OF DONIPHAN, NEBRASKA.

GLASS-TUBE CUTTER.

SPECIFICATION forming part of Letters Patent No. 365,190, dated June 21, 1887.

Application filed March 31, 1887. Serial No. 233,162. (No model.)

*To all whom it may concern:*

Be it known that I, LAURENCE P. LINDGREN, of Doniphan, Hall county, in the State of Nebraska, have invented a new and Improved Glass-Tube Cutter, of which the following is a specification, reference being had to the annexed drawings, forming a part thereof, in which—

Figure 1:
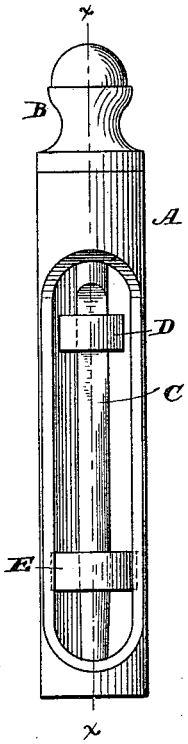
Figure 2:
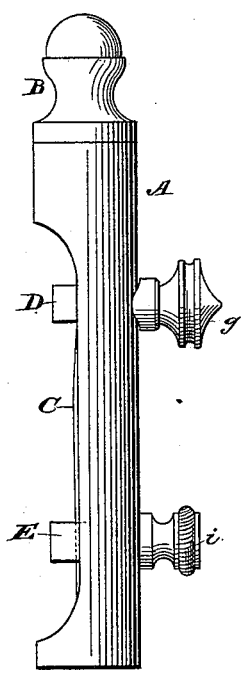
Figure 3:
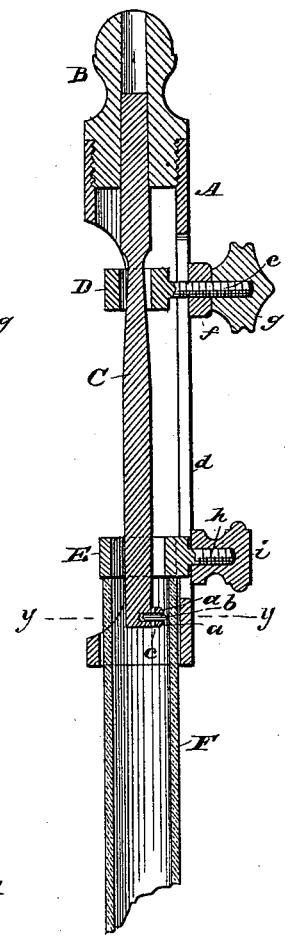
Figure 4:
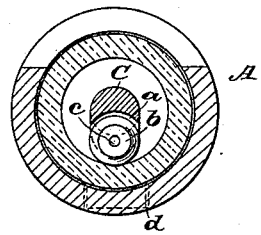

Figure 1 is a front elevation of my improved glass-tube cutter. Fig. 2 is a side elevation of the same. Fig. 3 is a longitudinal section taken on line *x x* in Fig. 1, showing the cutter in operation; and Fig. 4 is an enlarged transverse section taken on line *y y* in Fig. 3.

Similar letters of reference indicate corresponding parts in all the views.

The object of my invention is to provide a compact, inexpensive, and effective tool for cutting off the ends of glass tubes, particularly of water-gage tubes used in connection with steam-boilers, to adapt them to their fittings.

My invention consists in a tube cut away upon one side, stopped in one end, and provided with a central rod supported axially in the tube and carrying near its free end a roller glass-cutter capable of engaging the inner surface of the tube to be cut.

It also consists in a gage for regulating the length of tube to be removed; also in means for springing the central cutter-carrying rod, so as to bring the cutter into engagement with the inner surface of the tube.

The tube A, forming the body of the instrument, is of sufficient internal diameter to receive the largest glass tube to which it is to be applied. In one end of the tube A is inserted a plug, B, from which a rod, C, extends axially through the tube A to a point near the opposite end of the said tube, where it is provided with two parallel lateral ears, *a*, between which is placed a steel roller, *b*, having a V-shaped periphery and pivoted on the pin *c*, extending through the said ears *a*. The rod C, near its fixed end, is reduced in thickness, to enable it to spring laterally for the purpose of adjusting the cutter. The tube A is cut away upon one side throughout the greater portion of its length, and in the opposite side is formed a slot, *d*.

An eye, D, placed on the rod C, is provided with a threaded shank, *e*, which extends through the slot *d* and receives a washer, *f*, and milled nut *g*. Between the eye D and the open end of the tube is placed a ring, E, which fills the tube and is provided with a shank, *h*, which extends through the slot *d* in the side of the tube A and receives a milled nut, *i*, by means of which the ring E may be clamped in any desired position along the length of the tube A.

The method of using my improved tube-cutter is as follows: The ring E is adjusted so that the space between its outer face and the roller *b* is equal to the amount to be removed from the glass tube. The glass tube F is then inserted in the open end of the tube A and brought into contact with the ring E, which forms the gage. The eye D is then drawn toward the slotted side of the tube A by turning the nut *g*, thus springing the rod C and bringing the roller *b* into contact with the inner surface of the glass tube. By turning the tube F in the tube A the roller *b* cuts the tube at the prescribed line.

In the case of light tubes the rod C may be sprung aside sufficiently to cause it to cut the glass without the necessity of employing the eye D and nut *g*.

It is obvious that in lieu of employing the steel roller glass-cutter I may employ a diamond.

Having thus fully described my invention, I claim as new and desire to secure by Letters Patent—

1. In a glass-tube cutter, the combination of the tube A, the rod C, supported axially in the tube, and the glass-cutter carried by the said rod C, substantially as described.

2. In a glass-tube cutter, the combination of the slotted tube A, the rod C, carrying the cutter-roller *b*, having a V-shaped periphery, and the adjustable gage-ring E, substantially as described.

3. In a glass-tube cutter, the combination of the slotted tube A, provided with the plug B, the rod C, supported axially in the tube A by the plug B, the cutter-roller *b*, journaled in the end of the rod C, the adjustable gage-ring E, and the cutter-adjusting eye D, substantially as described.

LAURENCE P. LINDGREN.

Witnesses:
W. J. BURGER,
JOHN SCHWIPS.